(12) United States Patent
Ingerman et al.

(10) Patent No.: US 7,484,102 B2
(45) Date of Patent: Jan. 27, 2009

(54) SECURING AUDIO-BASED ACCESS TO APPLICATION DATA

(75) Inventors: Aleksandr Ingerman, Seattle, WA (US); Bruce Cordell Jones, Bellevue, WA (US); Thomas W. Millett, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 830 days.

(21) Appl. No.: 10/935,633

(22) Filed: Sep. 7, 2004

(65) Prior Publication Data
US 2006/0053298 A1    Mar. 9, 2006

(51) Int. Cl.
G06F 21/00      (2006.01)
(52) U.S. Cl. ....................................................... 713/182
(58) Field of Classification Search ................. 713/182, 713/184
See application file for complete search history.

(56) References Cited

U.S. PATENT DOCUMENTS 6,088,429 A * 7/2000 Garcia ...................... 379/88.22
6,161,185 A * 12/2000 Guthrie et al. ................. 726/5
2002/0104027 A1 * 8/2002 Skerpac ....................... 713/202
2002/0194003 A1    12/2002 Mozer ...................... 704/270.1

FOREIGN PATENT DOCUMENTS

| EP | 1176493 A2 | 1/2002 |
| WO | WO 99/42992 | 8/1999 |
| WO | WO 03005621 A2 | 7/2003 |

* cited by examiner

Primary Examiner—Gilberto Barron, Jr.
Assistant Examiner—Cordelia Kane
(74) Attorney, Agent, or Firm—Workman Nydegger (57) ABSTRACT

The present invention extends to methods, systems, and computer program products for securing audio-based access to application data. A client sends and a server receives a request for audio-based access to application data. The server sends a first audio challenge for a user credential in response to the request. The client receives the first audio challenge and sends a user credential. The server receives the user credential and sends a second audio challenge. The second audio challenge is configured to be understandable to a user of the client but difficult to recognize using automated voice recognition techniques. The client receives the second audio challenge and sends an additional portion of data responsive to the second audio challenge. The server receives the additional portion of data and calculates a client authorization based on the received user credential and received additional portion of data.

38 Claims, 4 Drawing Sheets

SECURING AUDIO-BASED ACCESS TO APPLICATION DATA

CROSS-REFERENCE TO RELATED APPLICATIONS

Not applicable.

BACKGROUND OF THE INVENTION

1. The Field of the Invention

The present invention relates to accessing data and, more particularly, to securing audio-based access to application data.

2. Background and Relevant Art

Computer systems and related technology affect many aspects of society. Indeed, the computer system's ability to process information has transformed the way we live and work. Computer systems now commonly perform a host of tasks (e.g., word processing, scheduling, and database management) that prior to the advent of the computer system were performed manually. More recently, computer systems have been coupled to one another and to other electronic devices to form both wired and wireless computer networks over which the computer systems and other electronic devices can transfer electronic data. As a result, many tasks performed at a computer system (e.g., voice communication, accessing electronic mail, controlling home electronics, Web browsing, and printing documents) include the exchange of electronic messages between a number of computer systems and/or other electronic devices via wired and/or wireless computer networks.

Networks have in fact become so prolific that a simple network-enabled computing system may communicate with any one of millions of other computing systems spread throughout the globe over a conglomeration of networks often referred to as the "Internet". Such computing systems may include desktop, laptop, or tablet personal computers; Personal Digital Assistants (PDAs); telephones; or any other computer or device capable of communicating over a digital network.

In particular, telephony applications provide audio-based access to application data and often do not require access to a computer system. For example, using only a standard telephone, a user can dial into a telephony application and access application data (e.g., bank account information or the status of an order). Interfacing with the application data is initiated using various audio-based commands. For example, a user can submit spoken words through the microphone and Dual Tone Multi-Frequency ("DTMF") tones through the key pad.

Telephony applications can include decoder modules that decode DTMF tones into computer-useable digital data. For example, telephony applications can decode the sum of sine wave tones at 697 Hz and 1477 Hz into data representative of the key pad number 3. Telephony applications can also decode the sum of sine wave tones at other known frequencies into data representative of other corresponding key pad numbers and symbols (1, 2, 4-0, *, and #). Based on the design of the telephony application, the representative data may be interpreted as an actual number or symbol or alternately may have some other meaning. For example, data representing the key pad number 6 can be used to indicate the letters M, N, or O or may be indicative of a specific command.

Telephony applications can also include speech recognition modules that convert spoken words into computer-usable digital data and text-to-speech modules that convert computer-usable digital data into spoken words. At a telephone, a transducer (e.g., a microphone) converts spoken words into corresponding analog signals. The analog signals are transferred over, for example, a Public Switched Telephone Networks ("PSTN") to the telephony application.

Speech recognition modules receive the analog signals and convert the analog signals into corresponding computer-usable digital data. The speech recognition modules then compare the corresponding computer-usable digital data to stored digital data to identify or at least hypothesize on what was originally spoken into the microphone. The telephony applications can interpret the identified or hypothesized spoken words as a command. For example, identification of the word "checking" can be interpreted as a command to access a checking account.

In response to audio based commands (DTMF tones and/or spoken words), a telephony application can return application data to a user. For example, in response to a query for a checking account balance, speech recognition modules can convert stored digital data (the account balance) into a corresponding analog signal representing a checking account balance. The telephony application can send the analog signal to the telephone. The telephone receives the analog signal and a speaker converts the analog signal into spoken words, such as, for example, "your account balance is three-hundred twenty-four dollars and fifty-nine cents." Thus, telephony applications generally make application data more accessible.

Similar to other types of application data access, telephony applications often require that a user authenticate before access to application data is provided. Unfortunately, since the input interfaces for telephony interfaces are only voice and keypads, the type and length of authentication data that can be used is severely limited. Further, telephony applications are often utilized in public locations. Thus, it may be inappropriate to rely on voice input (e.g., spoken passwords) for authentication, since voice input could be overheard.

Accordingly, many telephony applications rely on numeric PINs entered using a telephone keypad as a primary method of authentication. However, since the input space is limited to 0-9, the complexity of passwords based on the input space is also correspondingly limited. Further, many users desire a PIN that is easy to remember and thus may not be willing to compensate for the limited input space by using longer passwords. For example, a typically user PIN consists of four digits and thus provides only 10,000 ($10^4$) possible different combinations. Accordingly, telephony applications are frequently subject to brute-force password attacks. For example, a malicious user may dial into a telephony application and enter possible combinations (either randomly or serially) from 0000 to 9999 to attempt to authenticate, until access is granted. In the event of a failure (e.g., too many incorrect PIN numbers), the malicious user simply hangs up and dials in again.

Further, while telephony applications are designed to provide application data access to telephone users, general-purpose computer systems can be configured to simulate telephone functionality. For example, a malicious user can configure a computer system with a modem to automatically and repeatedly dial into a telephony application and enter every possible combination of numbers for a specified input space, until access is granted. These automated brute-force attacks can make even longer passwords based on the 0-9 input space vulnerable.

When application data is accessible from computer systems or telephones having limited physical access, such as, for example, in office environments, it may be appropriate to disable an account after a specified number of failed authentication attempts (e.g., three). However, when application data is accessible from public computer systems or telephones, disabling accounts may be inappropriate. For example, a malicious user can use a publicly accessible telephone or computer system to repeatedly enter an incorrect PIN on purpose to disable a legitimate user's account (a type of "denial of service" attack). Thus, the legitimate user is then prevented from accessing the application data and may be required to obtain a new PIN (which are often delivered using ground based delivery mechanisms) to gain access. Therefore systems, methods, and computer program products that facilitate securing audio-based access to application data would be advantageous.

BRIEF SUMMARY OF THE INVENTION

The foregoing problems with the prior state of the art are overcome by the principles of the present invention, which are directed towards methods, systems, and computer program products for securing audio-based access to application data. A client, such as, for example, a telephone, sends a request for audio-based access to application data. A server, such as, for example, a general-purpose computer system receives the request for audio-based access to the application data. The server sends a first audio challenge for a user credential (e.g., a request for a Personal Identification Number ("PIN")) in response to the request.

The client receives the first audio challenge and sends a user credential (e.g., a PIN entered at a key pad) responsive to the first audio challenge. The server receives the user credential responsive to the first audio challenge. The server sends a second audio challenge for an additional portion of data (e.g., a spoken phrase requesting a number, word, or phrase be entered at a key pad). The second audio challenge is configured to be understandable to a user of the client but difficult to recognize using automated voice recognition techniques. The client receives the second audio challenge and sends an additional portion of data (e.g., a number, word, phrase entered at a key pad) responsive to the second audio challenge The server receives the additional portion of data responsive to the second audio challenge. The server calculates a client authorization based on the received user credential and received additional portion of data. The client authorization indicates if the client can access the requested application data. The server sends an authorization indication, indicating the calculated client authorization, to the client. The client receives the authorization indication.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

The principles of the present invention provide for securing audio based accessed to application data. A client, such as, for example, a telephone, sends a request for audio-based access to application data. A server, such as, for example, a general-purpose computer system receives the request for audio-based access to the application data. The server sends a first audio challenge for a user credential (e.g., a request for a Personal Identification Number ("PIN")) in response to the request.

The client receives the first audio challenge and sends a user credential (e.g., a PIN entered at a key pad) responsive to the first audio challenge. The server receives the user credential responsive to the first audio challenge. The server sends a second audio challenge for an additional portion of data (e.g., a spoken phrase requesting a number, word, or phrase be entered at a key pad). The second audio challenge is configured to be understandable to a user of the client device but difficult to recognize using automated voice recognition techniques. The client receives the second audio challenge and sends an additional portion of data (e.g., a number, word, phrase entered at a key pad) responsive to the second audio challenge.

The server receives the additional portion of data responsive to the second audio challenge. The server calculates a client authorization based on the received user credential and received additional portion of data. The client authorization indicates if the client can access the requested application data. The server sends an authorization indication, indicating the calculated client authorization, to the client. The client receives the authorization indication.

Embodiments within the scope of the present invention include computer-readable media for carrying or having computer-executable instructions or data structures stored thereon. Such computer-readable media may be any available media, which is accessible by a general-purpose or special-purpose computer system. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

In this description and in the following claims, a "network" is defined as one or more data links that enable the transport of electronic data between computer systems and/or modules. When information is transferred or provided over a network or another communications connection (either hardwired, wireless, or a combination of hardwired or wireless) to a computer system, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computer system or special-purpose computer system to perform a certain function or group of functions. The computer executable instructions may be, for example, binaries, intermediate format instructions such as assembly language, or even source code.

In this description and in the following claims, a "computer system" is defined as one or more software modules, one or more hardware modules, or combinations thereof, that work together to perform operations on electronic data. For example, the definition of computer system includes the hardware components of a personal computer, as well as software modules, such as the operating system of the personal computer. The physical layout of the modules is not important. A computer system may include one or more computers coupled via a network. Likewise, a computer system may include a single physical device (such as a mobile phone or Personal Digital Assistant "PDA") where internal modules (such as a memory and processor) work together to perform operations on electronic data.

Those skilled in the art will appreciate that the invention may be practiced in network computing environments with many types of computer system configurations, including, personal computers, laptop computers, hand-held devices, multi-processor systems, microprocessor-based or programmable consumer electronics, network PCs, minicomputers, mainframe computers, mobile telephones, standard telephones, PDAs, pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Some standard telephones include processing capability used, for example, to store and access speed dial numbers and caller ID data. Thus, these standard telephones can be viewed as computer systems. However, other standard telephones (and possibly other communications devices) are not configured with processing capability or alternately have significantly limited processing capability. It should be understood that the present invention can be practiced with devices that lack or have significantly limited processing capability. For example, the present invention can be practiced using a standard telephone having a speaker, microphone, and configured to generate Dual Tone Multi-Frequency ("DTMF") tones.

In this description and in the following claims, an "audio-based user-interface" is defined as the collective representation of an audio input device (e.g., a microphone), an audio output device (e.g, a speaker), and controls for generating tones (e.g., DTMF tones).

Figure 1:
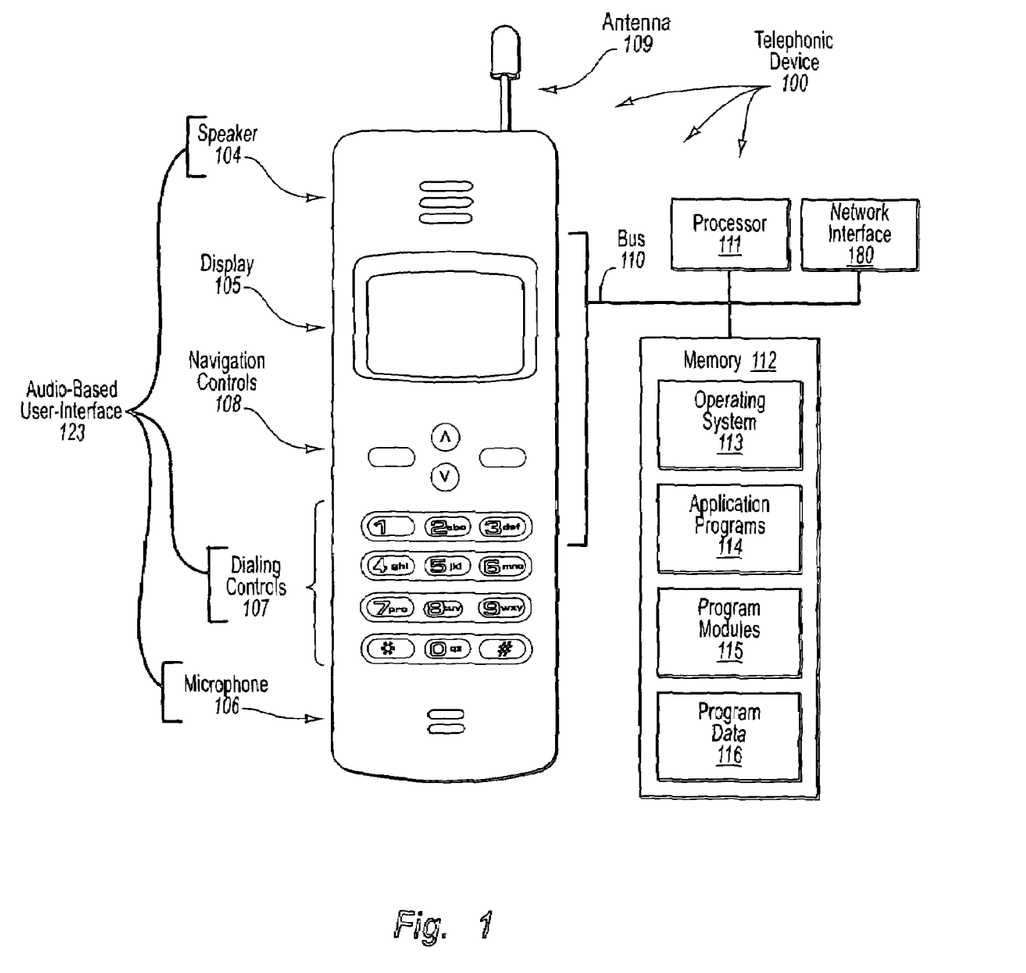
FIG. 1 illustrates a suitable operating environment for the principles of the present invention.

FIG. 1 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein.

With reference to FIG. 1, a suitable operating environment for the principles of the invention includes a general-purpose computer system in the form of a telephonic device 100. Telephonic device 100 includes a speaker 104 for presenting audio information (e.g., spoken words) to the user, a display 105 for presenting visual information to the user, a microphone 106 for inputting audio information (e.g., spoken words) into telephonic device 100, dialing controls 107 represented by 12 buttons through which a user may enter information (e.g., generate DTMF tones), and navigation control buttons 108 that assist the user in navigating through various entries and options listed on display 105. Although not required, telephonic device 100 may also have an antenna 109. Audio-based user-interface 123 collectively represents speaker 104, dialing controls 107, and microphone 106.

Although telephonic device 100 has the appearance of a mobile telephone, the unseen features of the telephonic device may allow for complex and flexible general-purpose processing capabilities. For example, the telephonic device 100 also includes processor 111, network interface 180, and memory 112 that are connected to each other and to speaker 104, display 105, navigation controls 108, dialing controls 107, microphone 106, and antenna 109 when appropriate, via system bus 110. The memory 112 generally represents a wide variety of volatile and/or non-volatile memories and may include types of memory previously discussed. However, the particular type of memory used in the telephonic device 100 is not important to the present invention. Program code means comprising one or more program modules may be stored in memory 112. The one or more program modules may include an operating system 113, one or more application programs 114, program modules 115, and program data 116.

Telephonic device 100 is connectable to networks, such as, for example, an office-wide or enterprise-wide computer network, an intranet, and/or the Internet. Telephonic device 100 can wirelessly exchange data with external sources, such as, for example, remote computer systems and/or application databases over such a network. Telephonic device 100 includes network interface 180 that can, when appropriate, interoperate with antenna 109 to receive data from external sources and/or transmit data to external sources. For example, telephonic device 100 can transmit DTMF tones and exchange other audio based data with external sources.

While FIG. 1 represents a suitable operating environment for the present invention, the principles of the present invention may be employed in any system that is capable of, with suitable modification if necessary, implementing the principles of the present invention. The environment illustrated in FIG. 1 is illustrative only and by no means represents even a small portion of the wide variety of environments in which the principles of the present invention may be implemented.

For example, as previously mentioned, embodiments of the present invention may also be practiced with devices that lack or have significantly limited processing capabilities (.e.g. standard telephones). Such devices can connect to networks, such as, for example, Public Switched Telephone Network ("PSTN") networks, that provide Plain Old Telephone Service ("POTS"). Alternately, such devices can connect to higher-speed digital communication lines, such as, for example, of Integrated Services Digital Network ("ISDN") and Fiber Distributed Data Interface ("FDDI") networks, that provide telephone services.

Figure 2:
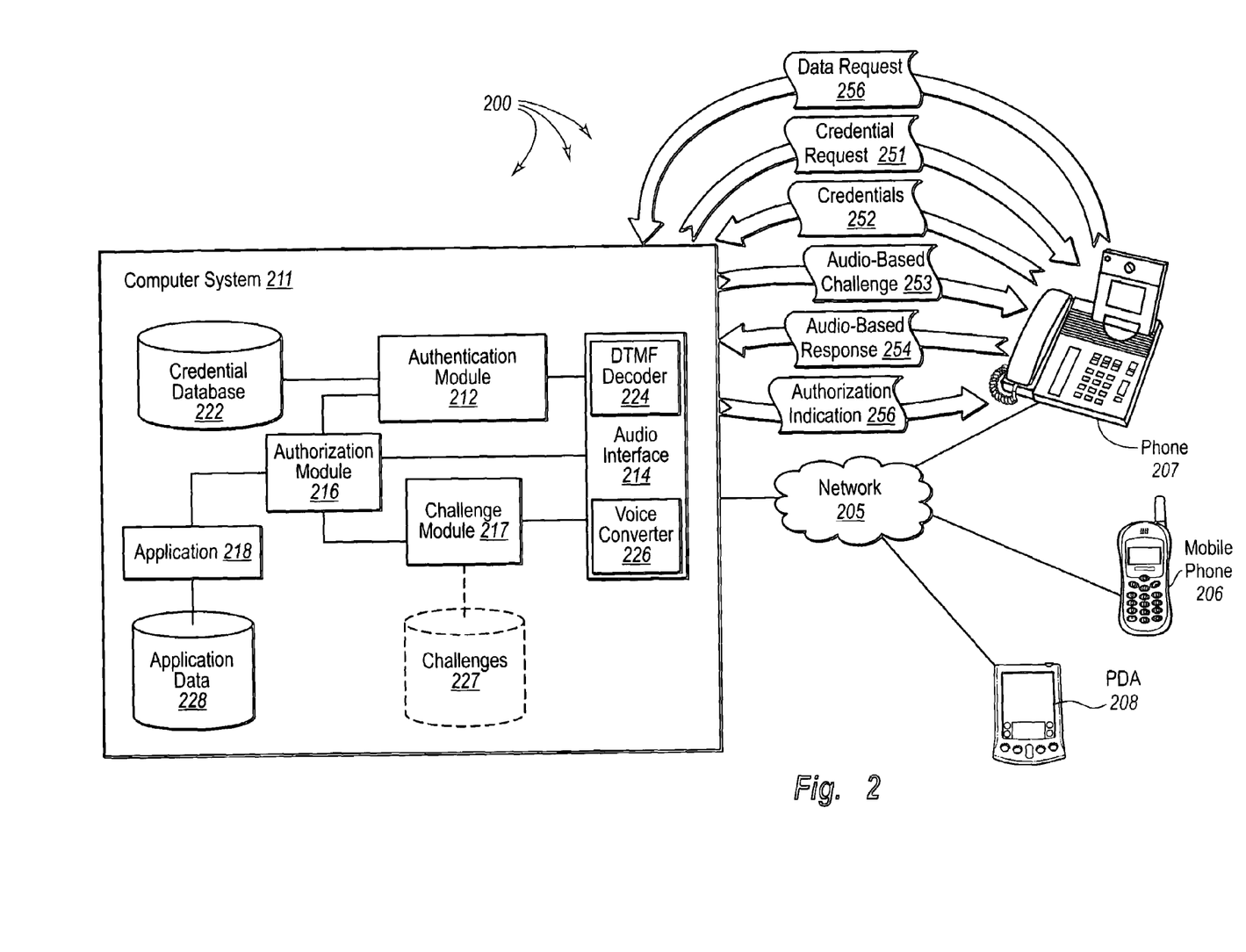
FIG. 2 illustrates an example of a computer architecture that facilitates securing audio-based access to application data.

FIG. 2 illustrates an example of a computer architecture 200 that facilitates securing audio based access to application data. As depicted in computer architecture 200 computer system 211, mobile phone 206, phone 207, and PDA 208 are connected to network 205. Network 205 can include portions of a PSTN and/or ISDN and/or FDDI network and/or portions of any other network that is capable of transferring DTMF tones and other audio-based data. In some embodiments, network 205 can include portions of a data network, such as, for example, a Local Area Network ("LAN"), a Wide Area Network ("WAN"), or even the Internet, that implements Voice over Internet Protocol ("VoIP") mechanisms.

Mobile phone 206 and PDA 208 can be configured similar to telephonic device 100. Phone 207 can be a standard telephone that lacks or has significantly limited processing capabilities. Mobile phone 206, PDA 208, and phone 207 can each include an audio-based user interface. Thus, mobile phone 206, PDA 208, and phone 207 can transmit DTMF tones and exchange other audio-based data, such as, for example, speech. For example, mobile phone 206, PDA 208, and phone 207 can establish connections (e.g., dialing a telephone number) to telephony applications and request audio-based access to application data (e.g., data request 256). In some embodiments, establishing a connection is performed prior to requesting audio-based access to application data. For example, a user may have to navigate through one or more audio-based menus to enter an appropriate command for requesting audio-based access to application data. In other embodiments, establishing a connection is the request for audio-based access to an application.

Generally, some clients (e.g., mobile phone 206 and PDA 208) may be configured to buffer DTMF tones (or data representing DTMF tones) as keys on a corresponding key pad are selected to generate the DTMF tones. In response to manipulation of other controls at the client, for example, selection of a send control, the client sends the buffered DTMF tones (or buffered data representing the DTMF tones). Thus, a message sent from a client can include a plurality of buffered DTMF tones or buffered data representing DTMF tones. Other clients may be configured to send DTMF tones as keys on a corresponding key pad are selected to generate the DTMF tones. Thus, a message sent from a client can also collectively represent a plurality of individually sent DTMF tones. However for clarity, individual messages for each generated DTMF tone are not depicted.

Computer system 211 (e.g., a general-purpose computer system) includes audio interface 214 that is configured to convert received analog audio data into digital data for use by other modules in computer system 211 and is configured to convert digital data into analog audio data for transmission to other devices. Audio interface 214 can buffer data from a client, for example, individually received DTMF tones, and process the buffered data, for example, processing individual received and buffered DTMF tones as an entered PIN.

Audio interface 214 includes DTMF decoder 224 and voice converter 226. DTMF decoder 224 can decode received DTMF tones into digital data. For example, DTMF decoder 224 can decode the sum of sine wave tones at 852 Hz and 1336 Hz into data representative of the key pad number 8. Voice converter 226 can convert received analog audio data representing speech into digital data (e.g., at a speech recognition module) for use by other modules of computer system 211 and convert digital data into analog audio data (e.g., text-to-speech module) representing speech for transmission to other devices.

Authentication module 212 is configured to receive entered credentials (e.g., an account number and PIN) and authenticate a user based on the entered credentials. In response to a client request to access application data, authentication module 212 can send an audio-based request for credentials (e.g., credential request 251) to the client. When authentication module 212 receives entered credentials (e.g., credentials 252), authentication module 212 compares the received entered credentials to previously established credentials stored in credential database 222. When received credentials are included in credential database 222, there is an increased likelihood that a user corresponding to the received credentials is who they purport to be. On the other hand, when received credentials are not included in credential database 222, there is a decrease likelihood that a user corresponding to the received credentials is who they purport to be.

Challenge module 217 is configured to issue audio-based challenges (audio-based challenge 253) to clients. An audio-based challenge can include a request to enter a number, word, or phrase at a keypad of an audio-based interface. Requested numbers, words, and phrases can be randomly generated or retrieved from a challenge database (e.g., challenges 227). Audio-based challenges can be configured such that the challenges are understandable to a user of the client but difficult to recognize using automated voice recognition techniques. Challenge module 217 can receive entered portions of data (e.g., audio-based response 254) that are responsive to an audio-based challenge. Challenge module 217 can compare received portions of data to challenge answers. When an entered portion of data resembles a challenge answer to within a specified threshold there is a decreased likelihood that the entered portion of data was entered by a brute force attack program.

Authorization module 216 is configured to calculate client authorization (e.g., client authorization 256) based on entered credentials and entered portions of data responsive to audio-based challenges. Authorization module 216 can receive the results of a credentials comparison from authentication module 212. Similarly, authorization module 216 can receive the results of an audio-based challenge from challenge module 217. Based on received results, authorization module 216 can determine if a corresponding client is authorized to access requested application data. When a client is authorized to access requested application data, authorization module 216 can allow the client to communicate with application 218 (e.g., a telephony application) and access application data 228.

Figure 3:
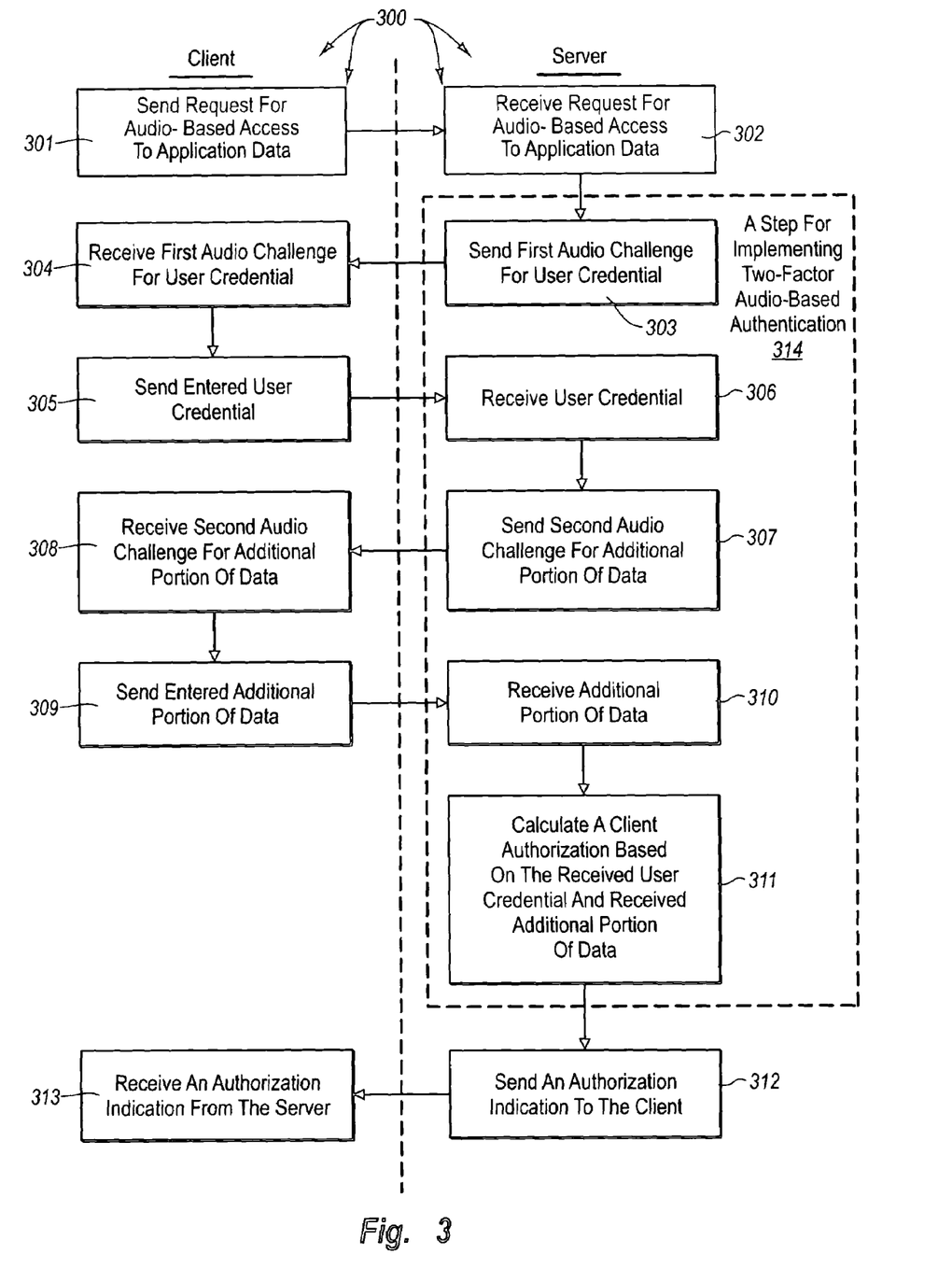
FIG. 3 illustrates an example flow chart of a method for securing audio-based access to application data.

FIG. 3 illustrates an example flow chart of a method 300 for securing audio based access to application data. The method 300 will be described with respect to the modules and data depicted in computer architecture 200.

Method 300 includes an act of sending a request for audio-based access to application data (act 301). For example, phone 207 can send data request 256 to computer system 211. Data request 256 can be a request for audio-based access to application data 228. Data request 256 can include one or more DTMF tones and/or speech-based commands.

Method 300 includes an act of receiving a client request for audio-based access to application data (act 302). For example, audio interface 214 can receive data request 256 from phone 207. DTMF decoder 224 can decode DTMF tones included in data request 256 into corresponding digital data. Likewise, voice converter 226 can convert speech-based commands included in data request 256 into corresponding digital data. The corresponding digital data can then be transferred to authentication module 212.

Method 300 includes a functional result-oriented step for implementing two-factor audio-based authentication (step 314). Step 314 can include any corresponding acts for implementing two-factor audio-based authentication. However, in the illustrated example of FIG. 3, step 314 includes a corresponding act of sending a first audio challenge for a user credential in response to the request (act 303). For example, authentication module 212 can formulate digital data representing a request for user credentials in response to data request 256. Audio interface 214 can receive the digital data and voice converter 226 can convert the digital data into credential request 251, which can be analog audio data representing speech. Computer system 211 can then send credential request 251 to phone 207 in response to data request 256.

Method 300 includes an act of an act of receiving a first audio challenge for a user credential (act 304). For example, phone 207 can receive credential request 251. A speaker at phone 207 can convert credential request 251 (analog audio data representing speech) into speech. For example, credential request 251 may cause a speaker at phone 207 to output the phrase "please enter your user ID" or "please enter your PIN."

In response, to credential request 251, a user of phone 207 can enter user credentials.

Method 300 includes an act of submitting a user credential responsive to the first audio challenge (act 305). For example, phone 207 can send credentials 252. Credentials 252 can include DTMF tones (and/or potentially speech) representing a user name, account number, PIN, etc.

Step 314 includes a corresponding act of an act of receiving a user credential responsive to the first audio challenge (act 306). For example, audio interface 214 can receive credentials 252 from phone 207. DTMF decoder 224 can decode DTMF tones included in credentials 252 into corresponding digital data. Likewise, voice converter 226 can convert any speech-based commands included in data request 256 into corresponding digital data. The corresponding digital data can then be transferred to authentication module 212.

Authentication module 212 can compare digital data representing credentials 252 to previously established credentials stored in credential database 222. It may be that credentials are compared after a hash transform (e.g., SHA1) thereby allowing credentials to be stored in more secure format. For example, credential database 222 can store hash values of previously established credentials. When credentials are received (e.g., credentials 252) in an attempt to become authorized to access application data, authentication module 212 can hash the received credentials using the same hashing algorithm that was used to generate the hash values previously established credentials. The hash value of the received credentials can be compared to hash values stored in credential database 222. Authentication module 212 provides the results of the comparison (e.g., whether or not credentials 252 are included in credential database 222) to authorization module 216. In some embodiments, the results of the comparison are retained by authorization module 216 but are not sent back to phone 207. Thus, an attacker can be prevented from receiving information indicating whether or not submitted credentials were valid.

Step 314 includes a corresponding act of sending a second audio challenge for an additional portion of data (act 307). The second audio challenge can be configured to be understandable to a user of the client but difficult to recognize using automated voice recognition techniques. For example, challenge module 217 can formulate digital data representing a second audio challenge. A second audio challenge can be a request to enter a number, word, or phrase using a key pad. Requested numbers, words, and phrases can be randomly generated or retrieved from a challenge database (e.g., from challenges 227). Audio interface 214 can receive the digital data and voice converter 226 can convert the digital data into audio-based challenge 253, which can be analog audio data representing speech. Computer system 211 can then send audio-based challenge 253 to phone 207.

Method 300 includes an act of receiving the second audio challenge for an additional portion of data (act 308). For example, phone 207 can receive audio-based challenge 253 from computer system 211. A speaker at phone 207 can convert audio-based challenge 253 (analog audio data representing speech) into speech. For example, audio-based challenge 253 may cause a speaker at phone 207 to output the phrase "please enter the following number using your keypad: one oh seven three two seven."

In response audio-based challenge 253, a user can enter a portion of data responsive to audio-based challenge 253.

Method 300 includes an act of sending an additional portion of data responsive to the second audio challenge (act 309). For example, phone 207 can send audio-based response 254 to computer system 211. Audio-based response 254 can include DTMF tones (and/or potentially speech) representing an answer to audio-based challenge 253.

Step 314 includes a corresponding act of receiving an additional portion of data responsive to the second audio challenge (act 310). For example, audio interface 214 can receive audio-based response 254 from phone 207. DTMF decoder 224 can decode DTMF tones included in audio based response 254 into corresponding digital data. Likewise, voice converter 226 can convert any speech-based data included in audio-based response 254 into corresponding digital data. The corresponding digital data can then be transferred to challenge module 217.

Challenge module 217 can compare digital data representing audio-based response 254 to an appropriate answer for audio-based challenge 217 (potentially referring to challenges 227). Challenge module provides the results of the comparison (e.g., whether or not audio-based response 254 resembles an answer to audio-base challenge 253 within a specified threshold) to authorization module 216. In some embodiments, the results of the comparison are retained by authorization module 216 but are not sent back to phone 207. Thus, an attacker can be prevented from receiving information indicating whether or not an audio-based response was correct.

Step 314 includes a corresponding act of calculating a client authorization based on the received user credential and received additional portion of data (act 311). The client authorization indicates if the client can access the requested application data. Authorization module 216 can formulate digital data representing a client authorization. A client authorization can be an indication of whether or not a client is authorized to access requested application data. When appropriate, a client authorization can indicate a client's rights, such as, for example, read, write, read/write, or delete, to application data. For example, authorization module 216 can calculate phone 207's authorization to application data 228 based on the results of comparing credentials 252 to credentials database 222 and the results of comparing audio-based response 254 to an appropriate answer for audio-based challenge 217.

When credentials 252 match established credentials stored in credentials database 222 and when audio-based response 254 is an appropriate answer for audio-based challenge 217, authorization module 216 can authorize phone 207 to access application data 228. However, when credentials 252 do not match established credentials stored in credentials database 222 or when audio-based response 254 is not an appropriate answer for audio-based challenge 217, authorization module 216 does not authorize phone 207 to access application data 228.

Method 300 includes an act of sending an authorization indication to the client (act 312). The authorization indication indicates the calculated client authorization to the client. For example, authorization module 216 can formulate digital data representing authorization indication 256. Audio interface 214 can receive the digital data representing authorization indication 256 and voice converter 226 can convert the digital data into authorization indication 256, which can be analog audio data representing speech. Computer system 211 can then send authorization indication 256 to phone 207.

Method 300 includes an act of receiving an authorization indication from the server (act 313). The authorization indication indicating if the client can access the requested application data. For example, phone 207 can receive authorization indication 256 from computer system 211. A speaker at phone 207 can convert authorization indication 256 (analog audio data representing speech) into speech. For example, authorization indication 256 may cause a speaker at phone 207 to output the phrase "Authorization failed. Please try Again." or "Thank You. You are now authorized." When authorized, phone 207 can subsequently access application data 228.

Providing an indication of failure or success after both a credential and an additional portion of data have been submitted, prevents an attacker from determining when a credential is correct but an additional portion of data is incorrect and from determining when an additional portion of data is correct but a credential is incorrect. Thus, an attacker is prevented from successfully obtaining a correct credential and then focusing efforts to obtain a correct portion of additional data and vice versa. Accordingly, the effort required for a successful brute force attack on a telephony application is significantly increased.

Following is a first example client dialogue that can be implemented in accordance with the principles of the present invention. The first example dialogue includes an audio-based challenge requesting that a user enter a number.

Key Pad Input: <user manipulates key pad to dial into an application>
Speaker Output: "Please enter your password"
Key Pad Input: <user manipulates key pad enter password>
Speaker Output: "For verification purposes, please re-enter the following number using your keypad: one oh seven three two seven"
Kay Pad Input: <user manipulates key pad to enter 107327>
Speaker Output: "Thank you. You are now authorized."

The audio-based challenge in the first example client dialogue can be implemented to significantly slow down a brute force attack program capable of voice recognition. The requested number can also be randomly generated each time a request for application data is received.

Following is a second example client dialogue that can be implemented in accordance with the principles of the present invention. The second example dialogue also includes an audio-based challenge requesting that a user enter a number.

Key Pad Input: <user manipulates key pad to dial into an application>
Speaker Output: "Please enter your password"
Key Pad Input: <user manipulates key pad to enter a valid password>
Speaker Output: "For verification purposes, please re-enter the following number using your keypad: One hundred seven thousands three hundred twenty seven"
Kay Pad Input: <user manipulates key pad to enter 107327>
Speaker Output: "Thank you. You are now authorized."

The audio-based challenge in the second example client dialogue presents a higher degree of difficulty for a brute force attack program since the requested number is in a longer form. Accordingly, to appropriately respond to the audio-based challenge, the brute force attack program must be able to recognize a large dictionary of words and parse the dictionary to identify an appropriate answer. The brute force attack program may also be required to determine that "One hundred seven thousands" is in fact "One hundred seven thousand"; however this may be intuitive to a legitimate user. The requested number can also be randomly generated each time a request for application data is received.

Following is a third example client dialogue that can be implemented in accordance with the principles of the present invention. The second example dialogue includes an audio-based challenge requesting that a user enter a word.

Key Pad Input: <user manipulates key pad to dial into an application>
Speaker Output: "Please enter your password"
Key Pad Input: <user manipulates key pad to enter a valid password>
Speaker Output: "For verification purposes, please enter the following word using your keypad: rabbit."
Kay Pad Input: <user manipulates key pad to enter 722248>
Speaker Output: "Thank you. You are now authorized"

The audio-based challenge in the third example client dialogue presents an even higher degree of difficulty for a brute force attack program. To identify an appropriate answer, the brute force attack program may be required to have a vocabulary that includes all valid words in a given language. However, it is reasonably simple for a legitimate user to identify an appropriate answer to the audio-based challenge in the third example client dialogue. The requested word can be randomly selected from a dictionary.

Following is a fourth example client dialogue that can be implemented in accordance with the principles of the present invention. The fourth example dialogue depicts how an attacker can be prevented from obtaining information on intermediate successes in two-factor authentication. In the fourth example, an attacker application may implementing a brute force attack that has little, if any, logic (e.g., the attacker application submits alpha numeric sequences that are incremented, such as, for example, abca, abcb, abcc, etc).

Attacker Application: <dials into an application>
Voice Application Sends: "Please enter your password"
Attacker Application: <enters an invalid password>
Voice Application Sends: "For verification purposes, please re-enter the following number using your keypad: one oh seven three two seven"
Attacker Application: <enters a number other than 107327>
Voice Application Sends: "Authorization Failed. Please Try Again"

As depicted in the fourth example client dialogue the attacker application is not provided with an indication of failure (or success) until after both the password and the challenge response have been submitted. Thus, the attacker application has no way to know if the password and/or the challenge response caused authorization to fail.

Following is a fifth example client dialogue that can be implemented in accordance with the principles of the present invention. The fifth example dialogue depicts how an attacker (e.g., an automated application) can be prevented from obtaining information on intermediate successes in two-factor authentication. The fifth example dialogue depicts how an attacker application with a correct password (e.g., determined by sheer elimination of possibilities) is still prevented from becoming authorized and is also prevented from even knowing that the password is correct.

Attacker Application: <dials into an application>
Voice Application Sends: "Please enter your password"
Attacker Application: <enters a valid password>
Voice Application Sends: "For verification purposes, please re-enter the following number using your keypad: one oh seven three two seven"
Attacker Application: <enters a number other than 107327>
Voice Application Sends: "Authorization Failed. Please Try Again"

As depicted in the fifth example client dialogue an attacker application is preventing from knowing that a valid password was entered. Thus, the attacker application cannot divert resources to identify an appropriate challenge response after a valid password is obtained.

Following is a sixth example client dialogue that can be implemented in accordance with the principles of the present invention. The sixth example dialogue depicts how an attacker (e.g., a human being using a telephone) having a high level of confidence in a challenge response is still prevented from becoming authorized.

Attacker: <dials into an application>
Voice Application Sends: "Please enter your password"
Attacker: <enters an invalid password>
Voice Application Sends: "For verification purposes, please re-enter the following number using your keypad: one oh seven three two seven"
Attacker: <enters the number 107327>
Voice Application Sends: "Authorization Failed. Please Try Again"

As depicted in the sixth example client dialogue an attacker is prevented from becoming authorized even though a challenge response was entered. Thus, the attacker application cannot divert resources to identifying a valid password after an appropriate number is obtained.

Figure 4:
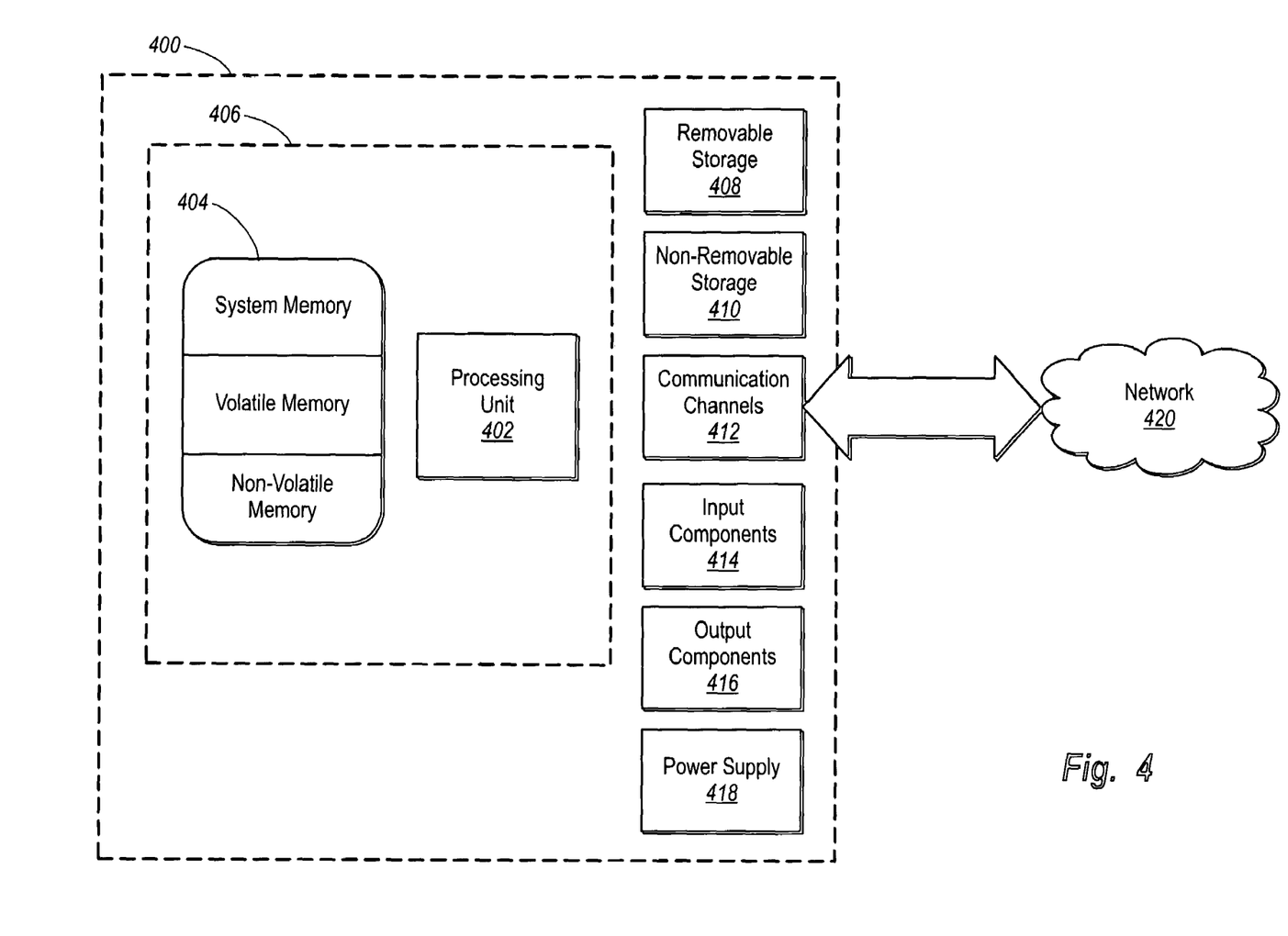
FIG. 4 also illustrates a suitable computer system that may implement features of the present invention.

FIG. 4 depicts a schematic diagram of a computer system 400. Computer system 211 can include one or more of the components included in computer system 400. For descriptive purposes, the depicted computer system is only one example of a suitable environment and is not intended to suggest any limitation as to the scope of use or functionality of the invention. Neither should the computer systems be interpreted as having any dependency nor requirement relating to any one or combination of components illustrated in FIG. 4.

In some basic configurations, computer system 400 includes at least one processing unit 402 and memory 404. The memory 404 may be volatile (such as RAM), non-volatile (such as ROM, flash memory, etc.), or some combination of the two. One basic configuration is illustrated in FIG. 4 by the dashed line 406.

Included storage media devices may have additional features and functionality. For example, they may include additional storage (removable and non-removable) including, but not limited to, PCMCIA cards, magnetic and optical disks, and magnetic tape. Such additional storage is illustrated in FIG. 4 by removable storage 408 and non-removable storage 410. Computer-storage media include volatile and non-volatile, removable and non-removable media implemented in any method or technology for storage of information such as computer-readable instructions, data structures, program modules, or other data. Memory 404, removable storage 408, and non-removable storage 410 are all examples of computer-storage media. Computer-storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by the computer system.

Computer system 400 may also contain communication channels 412 that allow the host to communicate with other systems and devices over a network 420. Communication channels 412 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

The computer system 400 may also have input components 414 such as a keyboard, mouse, pen, a voice-input component, a touch-input device, and so forth. Output components 416 include screen displays, speakers, printer, etc., and rendering modules (often called "adapters") for driving them. The computer system 400 has a power supply 418. All these components are well known in the art and need not be discussed at length here.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed:

1. At a client device having an audio-based user-interface that is configured to submit audio-based commands, a method for obtaining authorization to access remote application data, the method comprising:

an act of sending a request for audio-based access to application data to a server;

an act of receiving a first audio challenge for a user credential from the server;

an act of sending an entered user credential responsive to the first audio challenge to the server;

an act of receiving a second audio challenge requesting an additional portion of data from the server, the second audio challenge including speech-based instructions requesting a responsive sequence of DTMF tones responsive to the second audio challenge, at least a portion of the second audio challenge configured in a manner that purposefully obscures to some extent that the sequence of responsive DTMF tones is being requested such that a human user of the client device can understand that the sequence of responsive DTMF tones is being requested but automated voice recognition techniques have increased difficultly recognizing that the sequence of response DTMF tones is being requested so as to reduce the likelihood of brute force attacks gaining access to the application data;

an act of audibly outputting the second audio challenge at the client to request entry of the responsive sequence of DTMF tones, the second audio challenge output at the client device in a manner purposefully obscuring to some extent that the responsive sequence of DTMF tones is being requested;

act of receiving an additional portion of data responsive to the second audio challenge at the client device;

an act of sending the additional portion of data responsive to the second audio challenge to the server; and an act of receiving an authorization indication from the server, the authorization indication indicating if the client device can access the requested application data.

2. The method as recited in claim 1, further comprising:
an act of establishing a connection to the server prior to sending the request for audio-based access to application data.

3. The method as recited in claim 1, wherein the act of sending a request for audio-based access to application data comprises an act of establishing a connection to the server.

4. The method as recited in claim 1, wherein the act of receiving a first audio challenge for a user credential comprises an act of receiving speech-based instructions requesting a PIN.

5. The method as recited in claim 1, further comprising:
an act of receiving one or more key pad selections at an audio-based user-interface, the one or more key pad selections representative of the user credential.

6. The method as recited in claim 1, wherein the act of sending an entered user credential responsive to the first audio challenge comprises an act of sending one or more DTMF tones representative of a user credential.

7. The method as recited in claim 1, wherein the receiving a second audio challenge for an additional portion of data comprises an act of receiving speech-based instructions to enter a specified number at a key pad, the speech-based instructions purposefully representing audio output that is to audibly present one or more digits of the specified number in a non-formal manner so as to obscure that the second audio challenge is requesting the specified number.

8. The method as recited in claim 1, wherein the receiving a second audio challenge for an additional portion of data comprises an act of receiving speech-based instructions to enter a specified number at a key pad, the speech-based instructions purposefully representing audio output that is to audibly present a word so as to obscure that the second audio challenge is requesting the specified number.

9. The method as recited in claim 1, further comprising:
an act of receiving the additional portion of data comprises an act of receiving one or more key pad selections at an audio-based user-interface, the one or more key pad selections representative of a sequence of DTMF tones.

10. The method as recited in claim 1, wherein the act of sending an additional portion of data responsive to the second audio challenge comprises an act of sending one or more DTMF tones representative of an answer to the second audio challenge.

11. The method as recited in claim 10, wherein the act of sending one or more DTMF tones representative of an answer to the second audio challenge comprises an act of sending the responsive sequence of DTMF tones.

12. The method as recited in claim 10, wherein the act of outputting the second audio challenge at the client to request entry of the responsive sequence of DTMF tones comprises an act of outputting a word representing the numbers of the responsive sequence of DTMF tones to request entry of the responsive sequence of DTMF tones.

13. The method as recited in claim 1, wherein the act of receiving an authorization indication from the server comprises an act of receiving an indication that the client is authorized to access the requested application data.

14. The method as recited in claim 1, wherein the act of receiving an authorization indication from the server comprises an act of receiving an indication that the client is not authorized to access the requested application data.

15. The method as recited in claim 1, further comprising:
an act of accessing the requested application data subsequent to receiving the authorization indication.

16. The method as recited in claim 1, wherein the client is a wired telephone.

17. The method as recited in claim 1, wherein the client is a wireless telephone or PDA.

18. At a computer system having a processor and system memory that is configured to receive audio-based commands, a method for providing authorization to access application data, the method comprising:

an act of receiving a client request from a client, the client request requesting audio-based access to application data;
an act of sending a first audio challenge for a user credential in response to the request;
an act of receiving a user credential responsive to the first audio challenge;
an act of formulating a second audio challenge requesting an additional portion of data from the client, the second audio challenge including speech-based instructions audibly presentable at the client to request a responsive sequence of DTMF tones responsive to the second audio challenge, at least a portion of the second audio challenge configured in a manner that purposefully obscures to some extent that the sequence of responsive DTMF tones is being requested such that a human user of the client can understand that the sequence of responsive DTMF tones is being requested but automated voice recognition techniques have increased difficultly recognizing that the sequence of response DTMF tones is being requested so as to reduce the likelihood of brute force attacks gaining access to the application data;
an act of sending a second audio challenge to the client
an act of receiving an additional portion of data responsive to the second audio challenge from the client;
an act of calculating a client authorization based on the received user credential and received additional portion of data, the client authorization indicating if the client can access the requested application data; and
an act of sending an authorization indication to the client, the authorization indication indicating the calculated client authorization to the client.

19. The method as recited in claim 18, further comprising:
an act of establishing a connection to the client prior to receiving the request for audio-based access to application data.

20. The method as recited in claim 18, wherein the act of receiving a request for audio-based access to application data comprises an act of establishing a connection to the client.

21. The method as recited in claim 18, wherein the act sending a first audio challenge for a user credential comprises an act of sending analog audio data representative of a request for a PIN.

22. The method as recited in claim 18, wherein the act of receiving a user credential responsive to the first audio challenge comprises an act of receiving one or more DTMF tones representative of a user credential.

23. The method as recited in claim 18, wherein the act of formulating a second audio challenge for an additional portion of data comprises an act of formulating a word representing the numbers of the responsive sequence of DTMF tones to request entry of the responsive sequence of DTMF tones.

24. The method as recited in claim 1, further comprising:
an act of randomly generating the responsive sequence of DTMF tones prior to sending the second audio challenge.

25. The method as recited in claim 18, wherein the act of sending a second audio challenge for an additional portion of data comprises an act of sending speech-based instructions purposefully representing audio output that is to audibly present one or more digits of a specified number in a non-formal manner so as to obscure that the second audio challenge is requesting the specified number.

26. The method as recited in claim 23, further comprising:
an act of randomly selecting the word form a dictionary prior to sending the second audio challenge.

27. The method as recited in claim 18, wherein the act of receiving an additional portion of data responsive to the second audio challenge comprises an act receiving one or more DTMF tones representative of a number.

28. The method as recited in claim 23, wherein the act of receiving an additional portion of data responsive to the second audio challenge comprises an act receiving the responsive sequence of DTMF tones requested by audible presentation of the word.

29. The method as recited in claim 18, wherein the act of calculating a client authorization based on the received user credential and received additional portion of data comprises an act of calculating that the client is authorized to access the requested application data.

30. The method as recited in claim 18, wherein the act of calculating a client authorization based on the received user credential and received additional portion of data comprises an act of calculating that the client is not authorized to access the requested application data.

31. The method as recited in claim 18, wherein the act of sending an authorization indication to the client comprises an act of sending analog audio data representative of speech-based instructions to indicate the client is authorized to access the requested application data.

32. The method as recited in claim 18, wherein the act of sending an authorization indication to the client comprises an act of sending analog audio data representative of speech-based instructions to indicate the client is not authorized to access the requested application data.

33. The method as recited in claim 18, further comprising:
an act of providing the requested application data to the client subsequent to calculating the client authorization.

34. A computer program product for use at a computer system having an audio-based user-interface that is configured to submit audio-based commands, the computer program product for implementing a method for obtaining authorization to access remote application data, the computer program product comprising one or more computer storage media having stored thereon computer-executable instructions that, when executed by a processor, cause the device to perform the following:
send a request for audio-based access to application data to a server;
receive a first audio challenge for a user credential from the server;
send an entered user credential responsive to the first audio challenge to the server;
receive a second audio challenge requesting an additional portion of data from the server, the second audio challenge including speech-based instructions requesting a responsive sequence of DTMF tones responsive to the second audio challenge, at least a portion of the second audio challenge configured in a manner that purposefully obscures to some extent that the sequence of responsive DTMF tones is being requested such that a human user of the computer system can understand that the sequence of responsive DTMF tones is be requested automated voice recognition techniques have increased difficultly recognizing that the sequence of response DTMF tones is being requested so as to reduce the likelihood of brute force attacks gaining access to the application data;
audibly output the second audio challenge at the client to request entry of the responsive sequence of DTMF tones, the second audio challenge output at the computer system in a manner purposefully obscuring to some extent that the responsive sequence of DTMF tones is being requested:
receive an additional portion of data entered at the computer system:
send the additional portion of data responsive to the second audio challenge to the server; and
receive an authorization indication from the server, the authorization indication indicating if the computer system can access the requested application data.

35. A computer program product for use at a computer system that is configured to receive audio-based commands, the computer program product for implementing a method for providing authorization to access application data the computer program product comprising one or more computer storage media having stored thereon computer-executable instructions that, when executed by a processor, cause the computer system to perform the following:
receive a client request from a client, the client request requesting audio-based access to application data;
send a first audio challenge for a user credential in response to the client;
receive a user credential responsive to the first audio challenge from the client;
formulate a second audio challenge requesting an additional portion of data from the client, the second audio challenge including speech-based instructions audibly presentable at the client to request a responsive sequence of DTMF tones responsive to the second audio challenge, at least a portion of the second audio challenge configured in a manner that purposefully obscures to some extent that the sequence of responsive DTMF tones is being requested such that a human user of the client can understand that the sequence of responsive DTMF tones is be requested but automated voice recognition techniques have increased difficultly recognizing that the sequence of response DTMF tones is being requested so as to reduce the likelihood of brute force attacks gaining access to the application data;
send the second audio challenge to the client;
receive an additional portion of data responsive to the second audio challenge from the client;
calculate a client authorization based on the received user credential and received additional portion of data, the client authorization indicating if the client can access the requested application data; and send an authorization indication to the client, the authorization indication indicating the calculated client authorization to the client.

36. The computer program product as recited in claim 34, wherein computer-executable instructions that, when executed, cause the computer system to audibly output the second audio challenge at the client to request entry of the responsive sequence of DTMF tones comprise computer-executable instructions that, when executed, cause the computer system to audibly outputting a word representing the numbers of the responsive sequence of DTMF tones to request entry of the responsive sequence of DTMF tones.

37. The computer program product as recited in claim 35, wherein computer-executable instructions that, when executed, cause the computer system to formulate a second audio challenge requesting an additional portion of data from the client comprise computer-executable instructions that, when executed, cause the computer system to formulate speech-based instructions purposefully representing audio output that is to audibly present one or more digits of a specified number in a non-formal manner so as to obscure that the second audio challenge is requesting the specified number.

38. The computer program product as recited in claim 35, wherein computer-executable instructions that, when executed, cause the computer system to formulate a second audio challenge requesting an additional portion of data from the client comprise computer-executable instructions that, when executed, cause the computer system to formulate a word representing the numbers of the responsive sequence of DTMF tones to request entry of the responsive sequence of DTMF tones.

* * * * *